(12) United States Patent
Shen et al.

(10) Patent No.: US 7,395,407 B2
(45) Date of Patent: Jul. 1, 2008

(54) MECHANISMS AND METHODS FOR USING DATA ACCESS PATTERNS

(75) Inventors: Xiaowei Shen, Hopewell Junction, NY (US); Hazim Shafi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 11/250,288

(22) Filed: Oct. 14, 2005

(65) Prior Publication Data

US 2007/0088919 A1    Apr. 19, 2007

(51) Int. Cl.
*G06F 12/00* (2006.01)
(52) U.S. Cl. .................. 711/217; 711/154; 711/218
(58) Field of Classification Search .......... None
See application file for complete search history.

(56) References Cited

U.S. PATENT DOCUMENTS

2006/0248281 A1* 11/2006 Al-Sukhni et al. .......... 711/137

* cited by examiner

*Primary Examiner*—Reginald G. Bragdon
*Assistant Examiner*—Thanh D Vo
(74) *Attorney, Agent, or Firm*—F. Chau & Associates, LLC

(57) ABSTRACT

The present invention comprises a data access pattern interface that allows software to specify one or more data access patterns such as stream access patterns, pointer-chasing patterns and producer-consumer patterns. Software detects a data access pattern for a memory region and passes the data access pattern information to hardware via proper data access pattern instructions defined in the data access pattern interface. Hardware maintains the data access pattern information properly when the data access pattern instructions are executed. Hardware can then use the data access pattern information to dynamically detect data access patterns for a memory region throughout the program execution, and voluntarily invoke appropriate memory and cache operations such as pre-fetch, pre-send, acquire-ownership and release-ownership. Further, hardware can provide runtime monitoring information for memory accesses to the memory region, wherein the runtime monitoring information indicates whether the software-provided data access pattern information is accurate.

20 Claims, 3 Drawing Sheets

MECHANISMS AND METHODS FOR USING DATA ACCESS PATTERNS

GOVERNMENT RIGHTS STATEMENT

This invention was made with Government support under Contract No.: NBCH020056 award by Defense Advanced Research Projects Agency (DARPA). The Government has certain rights in this invention.

BACKGROUND OF THE INVENTION

1. Field of the Invention

The present invention relates generally to the field of computer memory, and, more particularly, to mechanisms and methods of using data access patterns to optimize performance of memory access operations in computer systems.

2. Description of the Related Art

In a modern computer system, data can usually be propagated in the memory and cache hierarchy. For a multi-processor system, data can be replicated in multiple caches, and a cache coherence mechanism can be employed to maintain cache coherence of the system. Ideally, an effective memory system should place data in the right place at the right time. This requires that requested data be moved to a cache close to the accessing processor in advance to reduce potential cache miss latency, and that the corresponding cache line be brought to an appropriate cache coherence state to reduce potential coherence overhead.

From a software perspective, different applications usually have different data access patterns. Given an application, different memory regions can exhibit different data access patterns. Furthermore, the same memory region may exhibit different data access patterns throughout the program execution. To improve overall performance, it is generally desirable to have a memory system that can be adaptive to various data access patterns.

For data access patterns that are dynamically predictable, hardware can incorporate appropriate prediction mechanisms. For example, the IBM® POWER 4 system comprises a hardware pre-fetch engine that allows hardware to detect streaming data accesses on-the-fly and to retrieve streaming data from memory automatically. When cache misses occur on sequential cache lines, the pre-fetch engine can initiate memory accesses to subsequent cache lines before they are referenced. This allows data to be pre-fetched from memory to an L3 cache, from the L3 cache to an L2 cache, and from the L2 cache to an L1 cache.

Many data access patterns can be statically detected or predicted, by the programmer or the compiler. For data access patterns that are statically predictable, software can specify proper heuristic information that can be passed to the underlying system. For example, the IBM® PowerPC® architecture comprises DCBT (data cache block touch) and DCBTST (data cache block touch for store) instructions, which behave as hints to hardware that data of a memory block should be pre-fetched to avoid potential memory access latency.

For many applications, the programmer or the compiler can determine possible data access patterns for some, if not all, commonly-used variables. The data access patterns may be more sophisticated than simple pre-fetch operations that intend to retrieve individual cache lines. However, modern computer systems lack an effective means for software to pass such data access pattern information to the underlying memory system. For example, in a multi-threading program, the programmer or the compiler may have good knowledge about memory addresses that are associated with a semaphore. This knowledge, if made available to the underlying memory system, could be used to reduce memory access latency. For example, when a processor acquires the semaphore, the semaphore could be an indication that data of the corresponding memory addresses associated with the semaphore should be pre-fetched to a cache close to the processor. However, software cannot inform hardware of such data access pattern information via an effective architecture interface.

Therefore, it is generally desirable to have an effective mechanism with appropriate architecture support that enables software to specify data access patterns that are to be passed to underlying hardware.

SUMMARY OF THE INVENTION

In one aspect of the present invention, a computer-based method of using data access patterns is provided. The method includes the steps of (a) specifying a data access pattern for a memory region; (b) maintaining data access pattern information of the data access pattern; and (c) invoking at least one memory and cache operation based on the data access pattern information.

In another aspect of the present invention, a system for using data access patterns is provided. The system includes a pattern storage unit and a pattern invocation unit. The pattern storage unit maintains data access pattern information of a memory region. The pattern invocation unit (a) updates the pattern storage unit when a processor executes a data access pattern instruction regarding the memory region, (b) detects a data access pattern of the memory region according to the data access pattern information, and (c) invokes at least one memory and cache operation based on the data access pattern information.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF PREFERRED EMBODIMENTS

Figure 1:
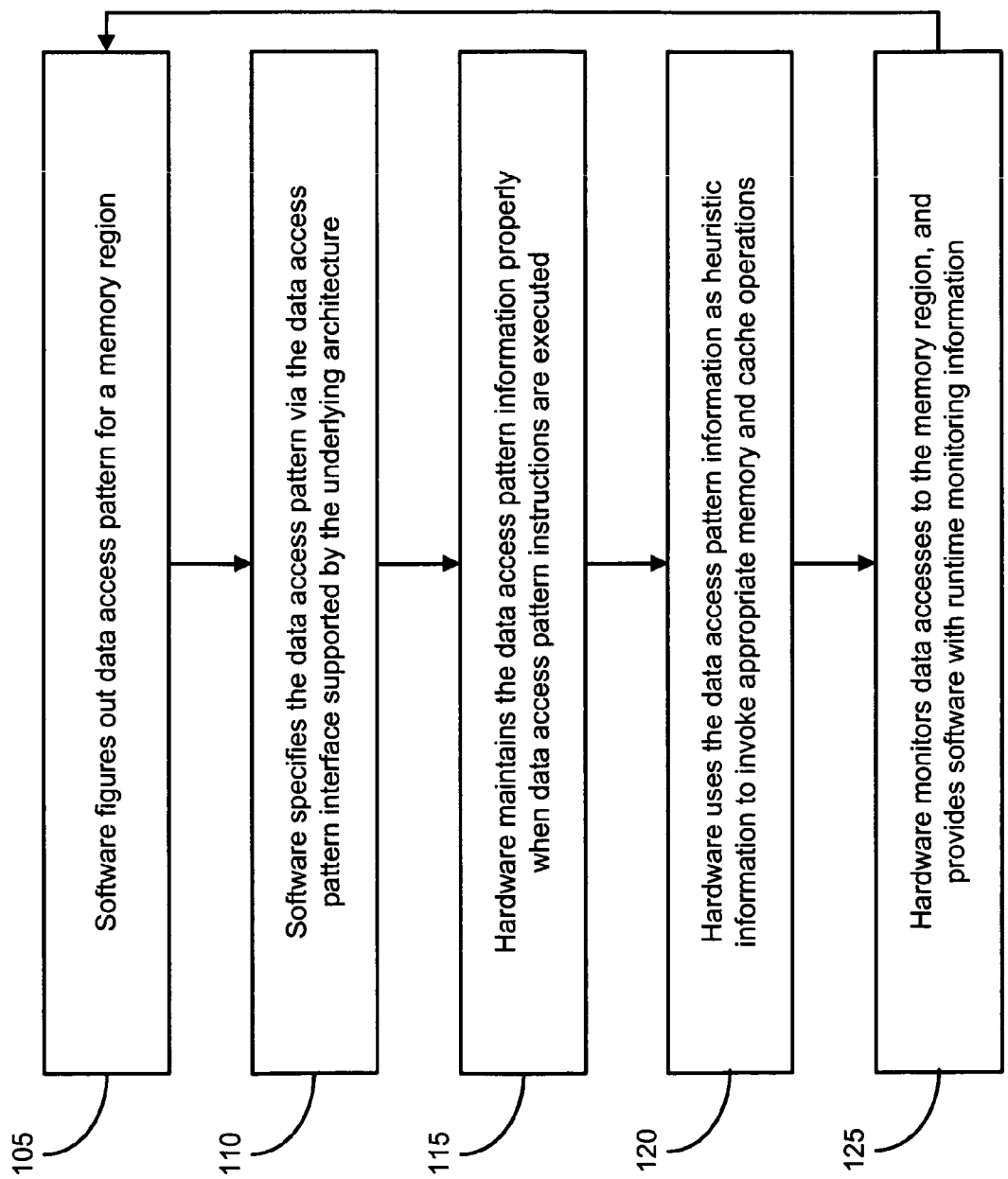
FIG. 1 depicts a flow diagram of an exemplary method of specifying, maintaining and using data access patterns according to an illustrative embodiment of the invention.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims. It is to be understood that the systems and methods described herein may be implemented in various forms of hardware, software, firmware, special purpose processors, or a combination thereof.

In an illustrative embodiment, the system comprises a data access pattern interface. The interface allows software to specify one or more pre-defined data access patterns, and to pass the data access patterns to hardware. Exemplary data access patterns include stream access patterns, pointer-chasing patterns, and producer-consumer patterns. While specifying data access patterns, software can also specify conditions under which data access patterns should be invoked. For example, for a streaming access pattern, software can also specify that the number of sequential cache lines that need to be accessed before the streaming access pattern can be invoked by hardware.

To effectively use data access patterns, a number of issues need to be addressed. First, software should be able to detect a data access pattern, and to pass the data access pattern information to hardware. Secondly, hardware should be able to maintain the data access pattern information properly, and to use the information to invoke proper memory and cache operations at appropriate times.

A data access pattern specifies how data in a memory region is likely to be accessed by one or more processors. A memory region comprises one or more memory addresses. For example, a continuous memory region can be defined with a starting memory address and the size of the memory region. A non-continuous memory region comprises memory addresses that are not continuous in the address space.

A data access pattern can describe not only characteristics of accesses to an individual memory address, but also the correlation between accesses to different memory addresses. Exemplary data access patterns include the following:

Read-Only memory-region. This pattern specifies that data in the memory region is read-only.

Write-Only memory-region. This pattern specifies that data in the memory region is write-only.

Read-Once memory-region. This pattern specifies that data in the memory region is read once. That is, when a processor retrieves data from memory or another cache, the processor is unlikely to read the data more than once before the data is modified by another processor.

Stream memory-region, stride. This pattern specifies a stream access pattern for the memory region. The stream access pattern can include an optional granularity for the stream-based pre-fetches.

Pointer-Chasing memory-region, offset. This pattern specifies that pointer-chasing data pre-fetches should be performed for the memory region. The pointer-chasing access pattern can also include an optional granularity for the pointer-chasing pre-fetches (with default to be set to the size of a cache line). With the pointer-chasing pattern, when memory address x (in the memory region) is accessed, memory address [x]+offset is pre-fetched, wherein [x] stands for data of address x.

Semaphore-Data memory-region, semaphore-address. This pattern specifies the association of a semaphore and its protected memory region.

Update-Coherence memory-region. This pattern specifies that the memory region should use an update-based cache coherence protocol rather than an invalidate-based cache coherence protocol.

Migratory memory-region. This pattern specifies that data of the memory region should be migrated from a cache to another. For example, when a supplying cache supplies data of a modified cache line to a requesting cache, data with the exclusive ownership should be supplied, even though a shared copy is requested at the time.

Producer memory-region producer. This pattern specifies that the memory region is likely to be written by the producer processor, although it remains unknown which processors will read from the memory region.

Consumer memory-region consumer. This pattern specifies that the memory region is likely to be read by the consumer processor, although it remains unknown which processors will write to the memory region.

Producer-Consumer memory-region producer, consumer. This pattern specifies that the memory region is likely to be written by the producer processor, and read by the consumer processor. In other words, the producer-consumer access pattern specifies a relationship between the producer processor and a consumer processor.

Support of a memory pattern interface can be incorporated with existing hardware and software solutions. In an illustrative embodiment, software can specify data access patterns using data access pattern instructions that are provided via an appropriate ISA (instruction set architecture) extension. For example, a stream access pattern instruction allows software to specify a stream access pattern for a memory region, with the starting address, the memory region size, and the stride of the stream. Similarly, a read-once access pattern allows software to specify a read-once pattern for a memory region, with the starting address and the memory region size. In an alternative embodiment, software can specify data access patterns using memory-mapped instructions. For example, when software performs a write operation to a particular address used for pattern specifications, the memory controller would interpret the memory write operation as a data access pattern specification, with data access pattern information encoded in the data written to that address.

We use data access pattern primitives to refer to either data access pattern instructions directly supported at the ISA level, or memory-mapped instructions used for specifying data access patterns. It should be appreciated to those skilled in the art that data access pattern primitives form a data pattern specification language, enabling software to concisely specify various data access patterns and effectively pass the pattern specification to hardware.

A data access pattern interface can include primitives that allow software to cancel data access patterns. Software may want to cancel a data access pattern for a memory region, if software predicts that the data access pattern will no longer hold for data accesses to that memory region. Software can make its prediction according to programmer-provided knowledge such as program annotation, compiler analysis, or hardware runtime monitoring information supplied by hardware. When software needs to cancel a data access pattern, software can explicitly specify the memory region for which the data access pattern needs to be cancelled. Alternatively, software can use the corresponding pattern handler that refers to the data access pattern that needs to be cancelled. In the latter case, hardware needs to provide software with a pattern handler when a data access pattern is specified, allowing software to refer to the data access pattern in the future if needed.

Software-supplied data access pattern information can be used to improve memory access performance. In the illustrative embodiment, the underlying memory system can employ an adaptive mechanism that comprises various voluntary operations. A voluntary operation can be invoked at any time without compromising the correctness of the memory system. The memory system can then use the heuristic data access pattern information to invoke appropriate memory access operations at appropriate times to reduce memory access latencies. For example, a voluntary pre-send operation enables the memory to supply data of a memory block to a cache without receiving a cache request from the cache. In a multiprocessor system, a voluntary acquire-ownership operation enables a cache to acquire exclusive ownership for a shared cache line before the corresponding processor executes a store operation. Likewise, a voluntary release-ownership operation enables a cache to downgrade an exclusive cache line to a shared cache line, allowing data of the cache line to be cached in a peer cache before any peer cache makes a request.

It should be appreciated that, while software can supply hardware with data access pattern information, hardware can provide software with feedback information throughout the program execution, wherein the feedback information indicates whether the software-supplied data access pattern information is accurate. For example, the memory system may detect that data pre-fetched according to some software-supplied data access pattern information is rarely used. The feedback information can be supplied to software for program profiling and dynamic compiler optimization, helping software generate or select more efficient code.

FIG. 1 shows a flow diagram of an exemplary method of specifying, maintaining and using data access patterns. First, software detects (at 105) a data access pattern for a memory region. Software then specifies (at 110) the data access pattern information and passes the information to hardware via the data access pattern interface. When data access pattern instructions are executed, hardware obtains the data access pattern information and maintains (at 115) the information properly. Hardware then uses (at 120) the data access pattern information to dynamically invoke appropriate memory and cache operations. Hardware can also collect (at 125) runtime monitoring information regarding the memory region, and provide such monitoring information back to software. As a result, software can use such feedback information to improve its prediction of data access patterns (i.e., step 125 loops to step 105), thereby optimizing the overall performance of the system.

When hardware receives data access pattern information from software, the data access pattern information needs to be maintained properly. For example, hardware can provide dedicated registers to maintain data access patterns. Alternatively, a data access pattern can be specified at the page or sub-page level. This allows data access pattern information to be maintained in an address translation table such as a TLB (Translation Look-aside Buffer) or a page table.

To support data access patterns, hardware generally needs to incorporate a pattern storage unit which can be used to maintain data access pattern information, and a pattern invocation unit which can be used to invoke appropriate memory and cache operations according to the data access pattern information. The pattern storage unit can be implemented as special registers and buffers, or it can be implemented as extensions of some existing hardware mechanism such as address translation tables. The pattern invocation unit interrogates the pattern storage unit, usually when a memory access instruction is executed by the processor, to determine whether appropriate memory and cache operations should be initiated according to the data access pattern information.

According to an illustrative embodiment of the present invention, parameters of a data access pattern (e.g., the starting address of a memory region, the stride of a stream access pattern) can be specified using one or more patterns registers. The pattern registers can be general registers or dedicated registers built into the processor. Software can write proper pattern registers with proper values to pass data access patterns to the underlying memory system. When dedicated pattern registers are used, the same set of pattern registers can be used for each access pattern, or alternatively, each pattern can have its own set of dedicated pattern registers associated with it. According to this exemplary embodiment of the invention, each data access pattern can be specified by one or more instructions issued by software.

Figure 2:
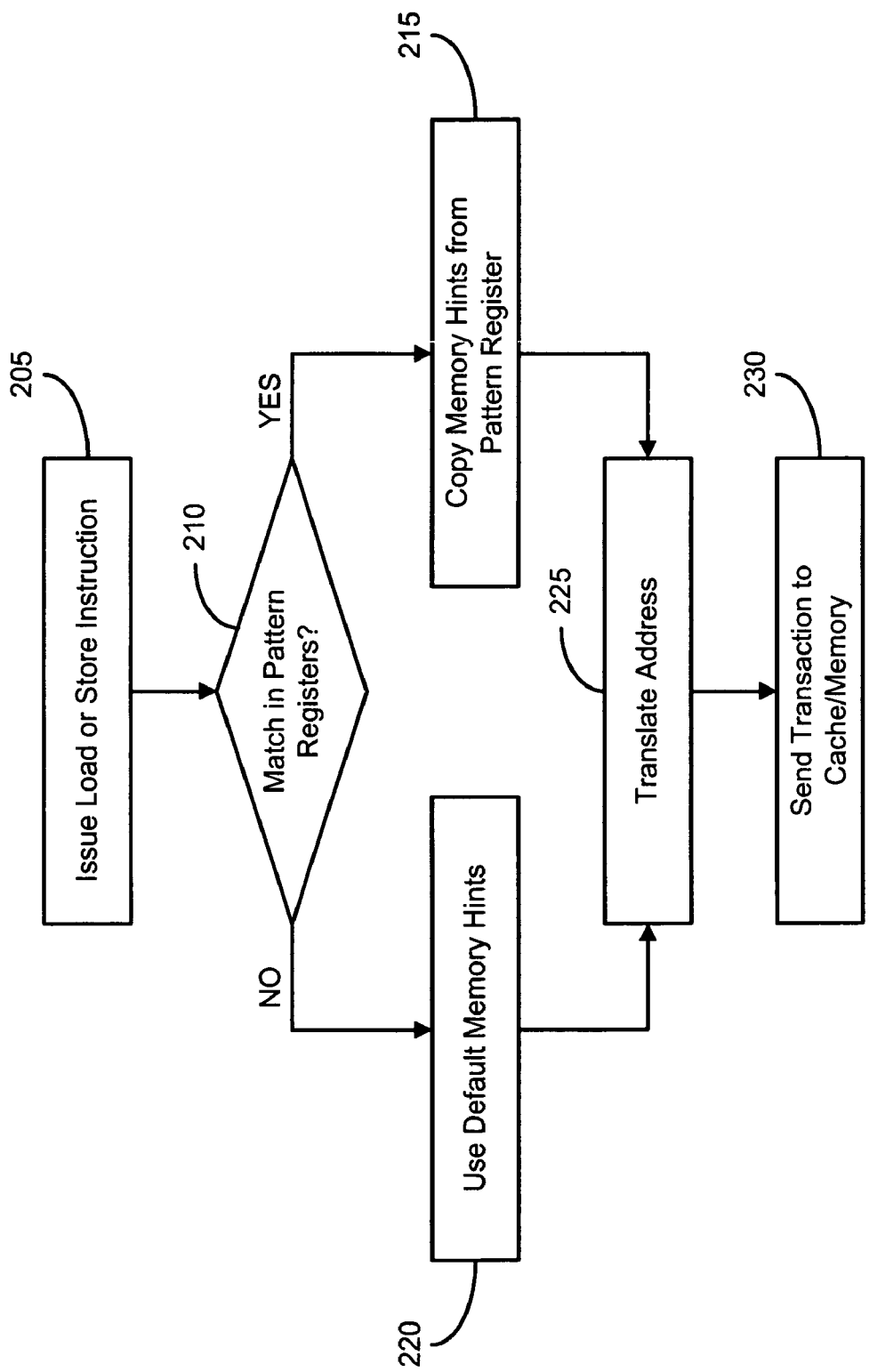
FIG. 2 depicts a flow diagram of a method of using pattern registers according to an illustrative embodiment of the invention.

FIG. 2 shows a flow diagram of a method of using pattern registers according to an illustrative embodiment of the invention. When an application wants to use special memory support for certain access patterns, it will set up the specific pattern registers with memory address ranges for the data structures that exhibit the respective access patterns. The pattern registers themselves are start address and end address pairs containing effective addresses. Referring now to FIG. 2, a memory access is initiated (at 205) by the issuance of a Load or Store instruction by the executable code. These instructions include references to effective addresses that refer to locations in memory. The load/store unit in the CPU compares (at 210) the effective addresses specified in the memory access instructions to the contents of the pattern registers to see if there is a match. If there is a match, the load/store unit copies (at 215) memory access pattern hints from the pattern register; otherwise, the load/store unit uses (at 220) the default memory hints. The effective address is translated (at 225) into a real (or physical) address, and the load or store instruction is issued (at 230) to the memory hierarchy of the processor. The memory access pattern hints that correspond to the matching pattern register, if any, are carried as part of the memory access when it is issued to the memory hierarchy. This provides the caches, memory fabric, pre-fetch mechanisms, and memory controllers with the ability to tailor their operation to optimize the system's performance for the specific memory access pattern when such support is included in the system executing the application program. When such support is not included, the operations will revert to normal load and store operations. As such, the pattern registers only provide performance hints that cannot alter program semantics if such hints are ignored by the memory subsystem.

According to another embodiment of the present invention, memory pattern hints can be specified using virtual memory support. With little additional hardware and software change, this approach allows data access pattern information to be maintained across context switches. In this embodiment, the changes required by the architecture definition are minimized, with the smallest number of additional resources being introduced to an actual implementation. The architectural changes need only be sufficient to notify the memory hierarchy of the need for "special handling" of certain load/store operations. An exemplary architecture that can easily be modified according to this embodiment of the invention is the PowerPC® architecture. The PowerPC® architecture is a flexible architecture that provides several mechanisms for supporting new features. For example, the PowerPC® architecture supports storage control attribute bits, referred to as the WIMG bits, which allows per virtual memory page control of certain memory access characteristics. The current exemplary architecture defines four bits: W (write-through), I (caching inhibited), M (coherence enabled) and G (guarded storage). A typical implementation includes these four bits, but does not use all the 16 possible bit combinations. Thus, unused bit combinations of the WIMG bits could be used to indicate a specific memory access pattern for a memory access instruction, so that the memory system will know how to perform the memory access most efficiently. However, in some PowerPC® implementations, there may be an insufficient number of unused WIMG bit combinations to specify each memory access pattern. Thus, more bits would need to be added to annotate the special access modes previously listed. The WIMG bits are included in the address translation page table entry (PTE) definition. When a load or store is translated, their WIMG attributes are passed along to the memory hierarchy providing an attractive option to support special handling of multiple memory access patterns. The PTE definition might also be modified to enlarge the number of bits used to specify memory access characteristics in future implementations.

It should be appreciated to those skilled in the art that another possibility of using data access patterns in the PowerPC® architecture is to use the Block Address Translation (BAT) registers, which include similar provisions for WIMG bits. Implementations using BAT registers typically implement a small number of these resources, so the preferred embodiment should probably use the PTEs since there can be many thousands of these entries that are cached using the hardware translation look-aside buffers (TLBs).

Figure 3:
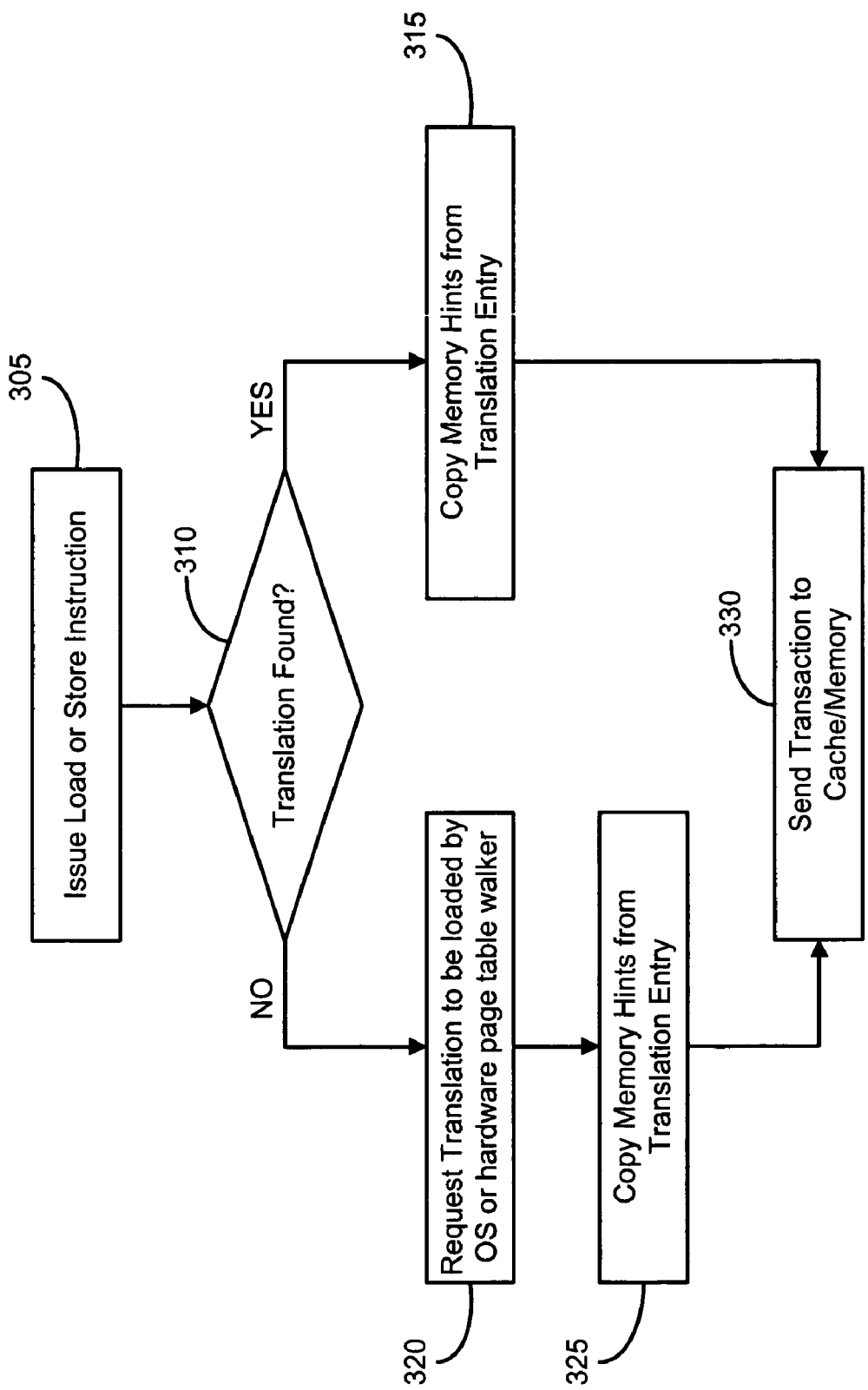
FIG. 3 depicts a flow diagram of a method of using address translation support according to an illustrative embodiment of the invention.

FIG. 3 shows a flow diagram of a method of using address translation support according to an illustrative embodiment of the invention. Referring now to FIG. 3, a memory access is initiated (at 305) by the issuance of a Load or Store instruction by the executable code. These instructions include effective addresses that refer to locations in memory. The CPU determines (at 310) if there is a translation of the memory references. If a translation is found, then the CPU copies (at 315) the memory access hints from the translation entry. Otherwise, the CPU requests (at 320) a translation to be loaded by the operating system or hardware page table walk. The CPU then copies (at 325) the memory hints from the translation entry to be passed along with the load or store request when it is presented to the memory hierarchy. The memory transaction is performed (at 330) and depending on the hints supplied, the semantics defined by the architecture and supported by the hardware implementation are performed.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A computer-based method of using data access patterns, comprising the steps of:
  (a) specifying a data access pattern for a memory region, the data access pattern comprising an invocation condition, wherein the invocation condition specifies under what condition the data access pattern is invoked;
  (b) maintaining data access pattern information of the data access pattern; and
  (c) invoking at least one memory and cache operation based on the data access pattern information and the invocation condition, wherein the invocation condition further specifies a number of sequential cache lines to be accessed before the data access pattern is invoked.

2. The method of claim 1, further comprising the steps of:
  (d) monitoring memory accesses of the memory region;
  (e) providing monitoring information resulting from step (d) to software, the monitoring information indicating whether the data access pattern information for the memory region is accurate; and
  (f) performing code optimization based on the monitoring information.

3. The method of claim 1, wherein the step of specifying a data access pattern comprises at least one of:
  (a) specifying a read-only pattern, the read-only pattern indicating that data in the memory region is read-only;
  (b) specifying a write-only pattern, the write-only pattern indicating that data in the memory region is write-only;
  (c) specifying a read-once pattern, the read-once pattern indicating that data in the memory region is read-once;
  (d) specifying a stream pattern, the stream pattern indicating a stream access pattern for the memory region;
  (e) specifying a pointer-chasing pattern, the pointer-chasing pattern indicating that pointer-chasing data pre-fetches should be performed for the memory region;
  (f) specifying a semaphore-data pattern, the semaphore-data pattern indicating the association of a semaphore and its protected memory region;
  (g) specifying a update-coherence pattern, the update-coherence pattern indicating that the memory region should use a update-based cache coherence;
  (h) specifying a migratory pattern, the migratory pattern indicating that data of the memory region should be migrated from a cache to another;
  (i) specifying a producer pattern, the producer pattern indicating that the memory region is likely to be written by a producer processor;
  (j) specifying a consumer pattern, the consumer pattern indicating that the memory region is likely to be read by a consumer processor; or
  (k) specifying a producer-consumer pattern, the producer-consumer pattern indicating that the memory region is likely to be written by a producer processor, and to be read by a consumer processor.

4. The method of claim 1, wherein the invocation condition specifies a number of sequential cache lines to be accessed before the data access pattern is invoked.

5. The method of claim 1, wherein the memory region includes at least one memory address, the at least one memory address comprising at least one of a virtual memory address, a real memory address, or a physical memory address.

6. The method of claim 1, wherein the at least one memory and cache operation comprises at least one of a data pre-fetch operation, a data pre-send operation, an acquire ownerrship operation, or a release-ownership operation.

7. The method of claim 1, wherein the step of specifying a data access pattern for a memory region comprises:
  executing at least one data access pattern instruction that defines the data access pattern.

8. The method of claim 1, wherein the step of maintaining data access pattern information of the data access pattern comprises:
  recording the data access pattern information in at least one data access pattern register, wherein the at least one data access pattern register can be used to specify a memory region and a corresponding data access pattern for the memory region.

9. The method of claim 1, wherein the step of maintaining data access pattern information of the data access pattern comprises recording the data access pattern information in an address translation mechanism, wherein the address translation mechanism comprises an address translation table.

10. The method of claim 1, wherein the step of invoking at least one memory and cache operation based on the data access pattern information comprises:
predicting whether the data access pattern should be invoked based on the data access pattern information; and
invoking at least one memory and cache operation if the result of the step of predict indicates that the data pattern should be invoked.

11. A system for using data access patterns, comprising:
a pattern storage unit for maintaining data access pattern information of a memory region; and
a pattern invocation unit for
(a) updating the pattern storage unit when a processor executes a data access pattern instruction regarding the memory region,
(b) detecting a data access pattern of the memory region according to the data access pattern information, the data access pattern comprising an invocation condition specifying under what condition the data access pattern is invoked, and
(c) invoking at least one memory and cache operation based on the data access pattern information and the invocation condition, wherein the invocation condition further specifies a number of sequential cache lines to be accessed before the data access pattern is invoked by the pattern invocation unit.

12. The system of claim 11, further comprising a memory access monitor for (a) monitoring memory accesses to the memory region; and
(b) providing dynamic memory access monitoring information to software.

13. The system of claim 11, wherein the data access pattern is at least one of:
(a) read-only pattern, which specifies that data in the memory region is read-only;
(b) write-only pattern, which specifies that data in the memory region is write-only;
(c) read-once pattern, which specifies that data in the memory region is read-once;
(d) stream pattern, which specifies a stream access pattern for the memory region;
(e) pointer-chasing pattern, which specifies that pointer-chasing data pre-fetches should be performed for the memory region;
(f) semaphore-data pattern, which specifies the association of a semaphore and its protected memory region;
(g) update-coherence pattern, which specifies that the memory region should use a update-based cache coherence;
(h) migratory pattern, which specifies that data of the memory region should be migrated from a cache to another;
(i) producer pattern, which specifies that the memory region is likely to be written by a producer processor;
(j) consumer pattern, which specifies that the memory region is likely to be read by a consumer processor; or
(k) producer-consumer pattern, which specifies that the memory region is likely to be written by a producer processor, and read by a consumer processor.

14. The system of claim 11, wherein the invocation condition indicates specifies a number of sequential cache lines to be accessed before the data access pattern is invoked by the pattern invocation unit.

15. The system of claim 11, wherein the memory region includes at least one memory address, the at least one memory address comprising at least one of a virtual memory address, a real memory address, or physical memory address.

16. The system of claim 11, wherein the at least one memory and cache operation comprises at least one of a data pre-fetch operation, a data pre-send operation, an acquire ownership ownership operation, or a release-ownership operation.

17. The system of claim 11, wherein the pattern storage unit is updated when a data access pattern instruction regarding the memory region is executed.

18. The system of claim 11, wherein the pattern storage unit comprises at least one data access pattern register, wherein the at least one data access pattern register can be used to record a memory region and a corresponding data access pattern for the memory region.

19. The system of claim 11, wherein the pattern storage unit records data access pattern information in an address translation mechanism, wherein the address translation mechanism comprises an address translation table.

20. The system of claim 11, wherein the pattern invocation unit determines whether the data access pattern should be invoked, and initiates appropriate memory and cache operations for the memory region if the data access pattern is invoked.

* * * * *